| | |
|---|---|
| E-1,2-DP | Ethane-1,2-diphosphonate |
| STP | Sodium tripolyphosphate |
| HHP | Hexane-1,2,3,4,5,6-hexaphosphonate, Hexane-1,2,3,4,5-pentaphosphonate, Hexane-2,3,4,5-tetraphosphonate mixture |

United States Patent Office 3,584,035
Patented June 8, 1971

3,584,035
ALIPHATIC VICINAL POLYPHOSPHONIC ACIDS, LOWER ALKYL ESTERS, WATER SOLUBLE SALTS THEREOF AND PROCESS FOR PREPARING SAME
Denzel Allan Nicholson, Springfield Township, Hamilton County, and Darrel Campbell, Fairfield, Ohio, assignors to The Procter & Gamble Company, Cincinnati, Ohio
Filed Dec. 27, 1967, Ser. No. 693,898
Int. Cl. C07f 9/38; C11d 1/12
U.S. Cl. 260—501.19          7 Claims

ABSTRACT OF THE DISCLOSURE

A class of aliphatic vicinal polyphosphonates, exemplified by pentane - 1,2,3,4,5 - pentaphosphonate, hexane-1,2,3,4,5,6 - hexaphosphonate, heptane - 1,2,3,4,5,6,7-heptaphosphonate. A process for preparing such compounds by reacting a compound having a formula R′—(C≡C)$_m$—CH$_2$X (e.g., H—C≡C—C≡C—CH$_2$OH), dialkylphosphite (e.g., diethylphophite) and an alkali metal promoter (e.g., sodium). The compounds are useful as detergency builders, sequestering agents, and anti-calculus agents in oral compositions.

BACKGROUND OF THE INVENTION

(1) Field of the invention

This invention pertains to vicinal polyphosphonates as a new class of organic phosphorus-containing compounds, and novel process for their preparation. The process is described in its broadcast terms of preparing aliphatic vicinal polyphosphonate esters which are readily converted to corresponding free acid compounds and to water soluble salts by reaction with a suitable base such as sodium hydroxide, potasium hydroxide, ammounium hydroxide, and the like.

(2) Description of the prior art

Organic polyphosphonates are known in the prior art which are gem-diphosphonates, such as methylenediphosphonic acid, CH$_2$(PO$_3$H$_2$)$_2$, e.g., U.S. Pat. 3,213,030; ethane-1-hydroxy-1,1-diphosphonic acid,

CH$_3$C(OH)(PO$_3$H$_2$)$_2$ e.g., U.S. Pat. 3,159,581. In addition, other polyphosphonates are known in which a phosphonate group is attached to the terminal carbons of a long chain aliphatic compound, e.g., CH$_2$(PO$_3$H$_2$(CH$_2$)$_n$CH$_2$(PO$_3$H$_2$), e.g., U.S. Pat. 3,297,578.

However, no prior art aliphatic compound is known, in which a single phosphonate group is attached to each carbon atom along the straight aliphatic chain containing from 5 to 10 carbon atoms. The present invention provides this class of compounds for the first time, together with a novel process for preparing such compounds. The novel properties of these compounds are also described and useful applications based on these properties are demonstrated and discussed.

SUMMARY OF THE INVENTION AND DESCRIPTION OF PREFERRED EMBODIMENTS

The present invention relates to and provides a new class of aliphatic vincinal polyphosphonate compounds having the following formula wherein
R is hydrogen; —CH$_2$X, in which X is hydroxyl, chlorine, bromine, iodine, or ortho-tosyl; and —CH$_2$(PO$_3$Y$_2$);
Y is a cation selected from hydrogen, lower alkyl ester containing from 1 to about 6 carbon atoms, alkali metal, ammonium or substituted ammonium; and n is an integer which is 5, 6, 7, or 8.

In the formula above, Y can be hydrogen, in which event, the acid form of the new compounds are represented such as pentane-1,2,3,4,5-pentaphosphonic acid (n=5); hexane-1,2,3,4,5,6-hexaphosphonic acid (n=6); heptane-1,2,3,4,5,6,7-heptaphosphonic acid (n=7); octane -1,2,3,4,5,6,7,8-octaphosphonic acid (n=8); nonane-1,2,3,4,5,6,7,8,9-nonaphosphonic acid (n=9); decane-1,2,3,4,5,6,7,8,9,10-decaphosphonic acid (n=10). The straight chain aliphatic compounds contemplated by the present invention therefore, contain from 5 to 10 carbon atoms.

In the formula above Y can be a lower alkyl ester compound in which the alkyl group contains from 1 to about six carbon atoms. The alkyl radicals can be methyl, ethyl, n-propyl, isopropyl, n-butyl, iso-butyl, n-pentyl, n-hexyl, iso-hexyl, and the like. The ester groups can be straight chain or branched chain as shown. Using the ethyl ester as being only representative, the present invention is illustrated by the following listed compounds:

decaethylester of pentane-1,2,3,4,5-pentaphosphonic acid,
octaethyl ester of pentane-5-hydroxy-1,2,3,4,-tetraphosphonic acid,
dodecaethyl ester of hexane-1,2,3,4,5,6-hexaphosphonic acid,
octaethyl ester of hexane-1,6-hydroxy-2,3,4,5-tetraphosphonic acid,
decaethyl ester of hexane-1-hydroxy-2,3,4,5,6-pentaphosphonic acid,
dodecaethyl ester of heptane-7-hydroxy-1,2,3,4,5,6- hexaphosphonic acid,
tetradecaethyl ester of heptane-1,2,3,4,5,6,7-heptaphosphonic acid,
dodecaethyl ester of octane-1,8-dihydroxy-2,3,4,5,6,7-hexaphosphonic acid,
tetradecaethyl ester of octane-8-hydroxyl-1,2,3,4,5,6,7-heptaphosphonic acid,
hexadecaethyl ester of octane-1,2,3,4,5,6,7,8-octaphosphonic acid,
hexadecaethyl ester of nonane-9-hydroxy-1,2,3,4,5,6,7,8-octaphosphonic acid,
octadecaethyl ester of nonane-1,2,3,4,5,6,7,8,9-nonaphosphonic acid,
hexadecaethyl ester of decane-1,10-dihydroxy-2,3,4,5,6,7,8,9-octaphosphonic acid,
octadecaethyl ester of decane-1-hydroxy-2,3,4,5,6,7,8,9,10-nonaphosphonic acid, and
eicosylethyl ester of decane-1,2,3,4,5,6,7,8,9,10-decaphosphonic acid.

In the preceding examples of illustrated ester compounds, additional examples are those in which the hydroxyl groups are replaced by any of the other definitions for X in the formula above including chlorine, iodine, bromine, and ortho-tosyl.

In the formula above, Y can also be an alkali metal selected from sodium, potassium, lithium and illustrative examples are (using sodium as being representative):

decasodium pentane-1,2,3,4,5-pentaphosphonate,
dodecasodium hexane-1,2,3,4,5,6-hexaphosphonate,
tetradecasodium heptane-1,2,3,4,5,6,7-heptaphosphonate,
hexadecasodium octane-1,2,3,4,5,6,7,8-octaphosphonate, octadecasodium nonane-1,2,3,4,5,6,7,8,9-nonaphosphonate, and
eicosylsodium decane-1,2,3,4,5,6,7,8,9,10-decaphosphonate.

The foregoing examples of sodium salts are fully neutralized acids; partial sodium salts also obviously fall within the broadest contemplation of the present invention.

In addition, Y can also be an ammonium or substituted ammonium water soluble cation such as monoethanol ammonium, di- and triethanol ammonium compounds, and the like.

The preferred embodiments of the present invention are when $n$ is a 6,7, or 8; R is hydrogen, —CH$_2$OH, —CH$_2$(PO$_3$Y$_2$); Y is hydrogen or alkali metal selected from sodium and potassium.

The compounds of the present invention, especially the aforementioned salts and acids, are all useful as detergency builders; and, in addition, as a class of compounds, they possess valuable sequestering and solubility properties which make possible their use in numerous industrial and household applications.

An especially useful embodiment of the present invention comprises built detergent compositions in which the novel compounds, especially the acid and alkali metal salts thereof, are employed as detergency builders for a wide variety of organic detergents as described and illustrated below.

The sequestering properties of the compounds of the invention make possible their use as additives to water supplies in which hardness-imparting ions such as calcium, magnesium, iron and the like represent a problem. Many industrial and household areas are known in which metal contaminants, even in trace amounts, represent such problems. A comprehensive discussion of properties and applications of sequestering agents is found in a text authored by Stanley Chabarek and Arthur E. Martell, entitled Organic Sequestering Agents (Wiley & Sons, 1959).

According to the present invention, it has now been discovered that aliphatic vicinal polyphosphonates of the class described above are prepared by reacting (A) an alkyne compound having a formula R'—(C≡C)$_m$—CH$_2$X in which R' is hydrogen or —CH$_2$X; and X is selected from bromine, chlorine, iodine, hydroxyl, and orthotosyl; and $m$ is an integer which is 2, 3, or 4; (B) a hydrogen dialkyl phosphite ester compound in which the alkyl group is a lower alkyl group containing from 1 to about 6 carbon atoms, and (C) a reaction promoter which is an alkali metal selected from the group consisting of sodium, potassium and lithium, or a hydride thereof.

The term "alkyne" compound is used hereinafter to refer to the unsaturated starting reactant containing the acetylenic triple bonds. As seen hereinafter, the proper selection of the alkyne starting reactant determines the reaction product. Suitable starting materials include penta-2,4-diyne-1-ol; hexa-2,4-diyne-1,6-diol; hepta-2,4,6-triyne-1-ol; octa-2,4,6-triyne-1,8-diol; nona-2,4,6,8-tetrayne-1-ol; deca - 2,4,6,8 - tetrayne-1,10-diol; hexane-1,6-dibromo-2,4-diyne; octane-1,8-dichloro - 2,4,6 - triyne; nonane-1-orthotosyl-2,4,6,8-tetrayne; decane-1,10-diiodo - 2,4,6,8-tetrayne; and the like. Specific examples are provided below. Hexa-2,4-diyne-1,6-diol is a preferred starting alkyne reactant.

The dialkyl phosphite compounds are liquids at room temperature and are readily available commercially. Illustrative examples are hydrogen dimethyl phosphite, hydrogen diethyl phosphite, hydrogen dipropyl phosphite, hydrogen diisopropyl phosphite, hydrogen dibutyl phosphite, hydrogen diisobutyl phosphite, hydrogen dipentyl phosphite and hydrogen dihexyl phosphite. The preferred compounds are hydrogen dimethyl phosphite, hydrogen diethyl phosphite and hydrogen diisopropyl phosphite.

The reaction requires a promoter which is an alkali metal or an alkali metal hydride. Specifically, the promoter can be sodium, potassium, lithium, sodium hydride, potassium hydride or lithium hydride. For convenience, the term "alkali metal promoter" is used below to encompass both the metals as well as the hydrides thereof.

While it is not absolutely essential to the exercise of the present invention, it is desirable to employ an inert, organic, non-protic solvent such as xylene, toluene, butyl ether and aliphatic saturated hydrocarbons having a boiling point in excess of about 60° C. Included among suitable hydrocarbons are straight chain or branch chain aliphatic compounds containing from about 7 to about 18 carbon atoms. Illustrative examples are heptane, octane, dodecane, tetradecane, octadecane, cycloheptane, cyclodecane, methylcyclohexane and the like. The solvent, in addition to being a solvent for the reaction product, also beneficially serves as a dispersing medium for the alkali metal promoter. The amount of solvent employed can range from 100 cc. to 2000 cc. but is preferably from 200 cc. to 750 cc. per mole of alkali metal promoter.

In order to obtain the maximum benefit from the present invention, it is desirable to employ the foregoing reactants in certain proportions. The reaction requires 2.0 moles of dialkyl phosphite per each triple bond in the starting R'—(C≡C)$_m$—CH$_2$X alkyne reactant, and one additional mole of dialkyl phosphite per each X group in the starting alkyne reactant. It is preferred to run the reaction using from 2 to 2.5 moles of dialkyl phosphite per each triple bond in the starting R'—(C≡C)$_m$—CH$_2$X alkyne reactant and from 1 to 1.5 additional mole per each X in the same alkyne reactant.

The molar proportion of alkyne reactant to dialkylphosphite should be in the range of from about 1:5 to about 1:15 and preferably from about 1:5 to about 1:12.

The alkali metal promoter should be used in a proportion of slightly more than one mole of promoter per each X group in the alkyne reactant. Generally, a proportion of 1.01 to 1.5 moles of promoter per each X group is satisfactory; preferably, from 1.25 to 1.5 mole of promoter is used per each X group.

The alkali metal promoter has two roles in the reaction. On the one hand it is a reactant on an equimolar basis with the hydrogen dialkyl phosphite to form sodium dialkyl phosphite which, as noted above, is a necessary material during the course of the reaction. In this way the alkali metal promoter also serves as a promoter or catalyst for the addition of the first two phosphonate groups across the acetylenic bond of the alkyne starting material at the outset of the reaction. The amount required to satisfactorily promote this catalyzed addition can be relatively small, i.e., as low as .05 to .3 equivalent of alkali metal promoter. Larger amounts, i.e., greater than .5 mole can also be used but without any material advantage. There may, in fact, be some slight disadvantage to using more than about .5 equivalent of the promoter because it may then react with reaction intermediates to form undesired by-products and thus decrease the overall yield of the desired polyphosphonate reaction product. Taking into consideration the amount of alkali metal required (1) to promote or catalyze the initial diphosphonate addition reaction, and (2) to aid in the dehydration of alcoholic intermediates (1 equivalent) means that the overall process requires from about 1.05 to about 2.7 moles of alkali metal promoter per mole of alkyne compound and, preferably, 1.05 to about 2.5 moles of alkali metal promoter per mole of the alkyne compound.

The reaction can be carried out within a temperature range of from about 20° C. to about 100° C. but a range of about 50° C. to about 80° C. is preferred. Temperatures below 20° C. should not be used because the reaction would be too slow thereby necessarily involving inordinately long reaction times; while reaction temperatures above 100° C. can result in decomposition of the reaction product and thereby decrease yields of the desired product.

The reaction can take from about 30 minutes to about 80 hours but is preferably completed in from about 1 hour to about 50 hours.

Although not absolutely essential, there is a preference for stirring the reaction mixture during the reaction, as this affords better contact between the reactants and generally facilitates a smoother, more efficient reaction.

In view of the various starting alkyne reactants the present invention is described in terms of using hexa-2,4-diyne-1,6-diol as a representative reactant. The representative reaction product is a mixture of hexane compounds as more fully described and illustrated below.

So far as the reaction mechanism is concerned, it was not expected that phosphonate groups would attach vicinally along the aliphatic chain to the terminal carbon atoms not connected by an acetylenic bond. Since the exact course of the reaction was unfamiliar, it was theorized that the reaction would only proceed to the addition of phosphonate groups across the triple bonds. Using $CH_2OH-C\equiv C-C\equiv C-CH_2OH$ as an example it was theorized that the following reaction would occur:

$$CH_2OH-C\equiv C-C\equiv C-CH_2OH + HPO_3R_2 \xrightarrow{Na}$$

Attempts were made to isolate significant quantities of an unsaturated tetraphosphonate intermediate but they were unsuccessful. It was thus unexpectedly discovered that, in the presence of sodium phosphite, an unsaturated intermediate, is generated and rapidly converts to a mixture of hexane-1,2,3,4,5,6-hexaphosphonate ester. It was surprising to discover that water is so rapidly eliminated from the reaction in such an extremely facile reaction. This rapid dehydration seems to be peculiar to esters of vicinal polyphosphonic acid, at least without using forced reaction conditions.

Following the reaction described above, the hexane polyphosphonate is present in the reaction as ester. Attempts were made to recover the esters by an ordinary distillation procedure. Such a procedure had been found to be satisfactory for other vicinal polyphosphonates, such as esters of propane-1,2,3-triphosphonic acid as described in a copending patent application being filed concurrently herewith. It was then discovered that the distillation recovery process was not operable. In order to recover the desired hexane polyphosphonate ester in substantial yields, it has been found necessary to hydrolyze the hexane polyphosphonate lower alkyl esters to hexane polyphosphonic acid, and react the acid with an alkaline earth metal salt at a reaction pH of about 6.5 to 8, preferably about 7. Under these conditions, an insoluble salt of the hexane polyphosphonic acid is formed which can be easily recovered (e.g., filter, centrifuge). The calcium salt can then be readily converted to pure hexane polyphosphonic acid either by an ordinary reaction with hydrogen chloride or preferably by an ion exchange reaction. The polyphosphonic acid so formed is easily neutralized with a base material to form, e.g., an alkali metal salt, or by a suitable reaction with a trialkylorthoformate be converted to a pure ester form.

Prior to discovering this recovery technique, i.e., one which takes advantage of the low solubility of an insoluble alkaline earth metal salt of the hexane polyphosphonic acid, several other procedures were attempted unsuccessfully. As mentioned, separation and recovery by distillation was not possible because of the high boiling point of the ester. In addition, the ester could not be conveniently crystallized and recovered. It was then converted to the acid by refluxing with excess concentrated hydrochloric acid. Unfortunately, the polyphosphonic acid was recovered as a viscous glass, which likewise would not crystallize readily. Attempts to induce sodium, aniline and cyclohexylamine salts to crystallize failed. Finally, the separation embodiment of the present invention was discovered according to which a very insoluble alkaline earth metal (e.g., calcium, magnesium) polyphosphonate is precipitated by reacting the hydrolyzed hexane polyphosphonic acid with an alkaline earth metal salt at a pH in the range of 6.5 to about 8, and preferably about pH 7.

To practice this embodiment of the invention, the hexane polyphosphonate ester in the reaction mixture is hydrolyzed by any known manner. For instance, the hydrolysis can be performed by adding from about 8 to about 20 equivalents of hydrogen chloride to the mixture and heating to a temperature in the range of from about 50 to 100° C., preferably 80 to 100° C. for from about 1.5 to 5 hours, preferably 2 to 4 hours.

The hydrolyzed hexane polyphosphonic acid is then reacted with an inorganic alkaline earth metal salt, such as calcium chloride, in a reaction medium having a pH in the range of about 6.0 to about 8.0 and preferably 6.5 to 7.5.

Since the hydrolyzed acid renders the reaction mixture to be acid, it is necessary to adjust the pH of the reaction mixture to the necessary range by adding sufficient base, such as sodium hydroxide. It is immaterial whether the alkaline earth metal compound is added to the hydrolyzed acid mixture followed by the pH adjustment or, alternatively, if the pH is first adjusted and then the alkaline earth metal compound is added. Either procedure works satisfactorily so that in its broadest terms the essential and novel recovery step comprises reacting hexane polyphosphonic acid with an alkaline earth metal compound in a reaction solution having a pH in the range of about 6-8 and preferably 6.5 to 7.5. If the alkaline earth metal compound is added to the acid solution, the reaction solution remains clear until the pH is adjusted, i.e., until the sodium hydroxide is added to render the pH to the proper range. Similarly, the acid solution remains clear during the pH adjustment step, and only becomes cloudy upon addition of the alkaline earth metal compound, e.g., calcium chloride.

The amount of alkaline earth compound required is in the range of from about 2.5 to about 6 equivalents, preferably about 2.5 to about 4 equivalents, of said alkaline earth compound per each equivalent of ester remaining after distillation. Sufficient base should be used to provide a pH of about 6.0 to about 8.0, preferably about 7.0. This adjustment will require varying amounts of base, within the range of from about 5 equivalents to about 8 equivalents of base per each equivalent of ester remaining after distillation.

The calcium salt which is formed is very insoluble and quickly precipitates out. Separation, as mentioned, is by ordinary means, e.g., filter, centrifuge. The separated calcium salt is converted to a free acid by either of two ways; (1) adding hydrochloride to dissolve the calcium hexane polyphosphonate, followed by an ion exchange reaction with a hydrogen cation exchange resin, or (2) by simply ion exchanging the calcium salt directly. This latter embodiment is a preferred embodiment. In order to convert the calcium salt form to a form in which it can be treated in an ion exchange step, the alkaline earth metal salt, e.g., calcium salt, is mixed with enough of the hydrogen ion exchange resin to get it into solution. This is followed by a routine ion exchange treatment from which pure hexane polyphosphonic acid is obtained.

If the recovery step is used of dissolving the calcium salt with hydrogen chloride prior to ion exchanging, hydrogen chloride will also be present in the ion-exchanged product. This hydrogen chloride can be easily stripped off by evaporation.

The final product in any event is pure hexane polyphosphonic acid which can be reacted with a suitable base to convert it to an alkali metal salt or it can be reacted with trialkyl orthoformate by known methods to form an ester of hexane polyphosphonate.

In the practice of this process, it is possible to practice a purification procedure which comprises repeating the CaCl₂/NaOH precipitation procedure several times.

Referring back to that portion of this description in which the reaction is described, it is pointed out that it is possible that during the reaction some sodium replacement of ester groups may occur. This will tend to occur above about 70° C. and will hold down the yield of the desired ester formation to the extent that it does occur. There is now described a preferred embodiment of this invention according to which the maximum yield of the desired hexane polyphosphonate ester is formed and subsequently recovered by the technique described above of forming a precipitate of a very insoluble calcium salt of hexane polyphosphonic acid.

This preferred embodiment calls for the additional reaction steps of evaporating the organic solvent from the reaction mixture, dissolving the reaction mixture in water, passing the aqueous solution of the reaction mixture through a hydrogen cation exchanger, re-esterifying the ion exchanged reaction mixture by reacting it with a trialkyl orthoformate, the alkyl group being a lower alkyl group which is the same as the alkyl group in the hydrogen dialkylphosphite starting reactant.

The re-esterified reaction product formed in this manner is then distilled to about 170° C. at reduced pressure to remove unreacted hydrogen dialkyl phosphite, leaving behind in the pot residue a crude reaction solution of hexane polyphosphonate ester. It is this crude ester reaction solution which is hydrolyzed to the acid and recovered via the insoluble alkaline earth metal precipitate route described in detail above.

According to this preferred embodiment which assures the recovery of maximum amounts of the desired hexane polyphosphonate compounds, the organic reaction solvent can be evaporated by any suitable means including distilling it off. The distillation or evaporation step can be performed within a temperature range of about 20° C. to about 120° C., preferably 40° C. to 100° C., and usually requires from about 20 minutes to 5 hours, preferably 1 hour to 3 hours.

The desired reaction mixture is then dissolved in water. The amount of water used is immaterial, since only enough should be used to dissolve the reaction mixture. The amount of water used can be in the range of from about ½ to 100 times the volume of the phosphonate ester; the preferred range being from about 2 to about 5 times the volume of the phosphonate ester.

The aqueous solution of the reaction mixture is comprised of hexane polyphosphonate esters any hydrogen dialkyl phosphite which was not removed during evaporation of the organic solvent, sodium hydrogen monoalkylphosphite partial salt, and possibly some hexane polyphonate intermediate reaction products.

This aqueous solution is passed through a hydrogen cation ion exchanger such as a sulfonated hydrocarbon type, e.g., Dowex 50W–X8 ion exchange resin, marketed by Dow Chemical Company. A great number of cation exchange resins have been synthesized and are commercially available having a variety of cationic groups, e.g., —OH, —COOH, —SO₃H, —CH₂SO₃H. Any such ion exchange resins can be used; the only distinction between any of them for purposes of the present invention is that some may be more effective than others. All hydrogen cation exchangers, however, should be operable. As a result of the hydrogen cation exchange step, the resulting reaction mixture will have all the sodium replaced with hydrogen. The water may then be evaporated and the reaction mixture can be re-esterified by reacting with a trialkyl orthoformate, the alkyl group containing from 1 to about 6 carbon atoms. Preferably, the alkyl group of the re-esterifying agent should be the same as the alkyl groups of the starting hydrogen dialkyl phosphite. There is no advantage to having a mixed ester group. The trialkyl orthoformate compound can be trimethyl orthoformate, triethyl orthoformate, tripropyl orthoformate, triisopropyl orthoformate, tributyl orthoformate, tripentyl orthoformate, trihexyl orthoformate, and the like.

In the ordinary practice of the present invention, it is difficult to known exactly how much, if any, ester replacement by sodium occurs during the reaction. It is not necessary, however, to know precisely how much trialkyl orthoformate should be used in the re-esterification step to replace the sodium ions. Full advantage of the invention can be had by using an amount of trialkyl orthoformate corresponding on an equimolar molar basis of the alkali metal promoter which is used. In other words, since the reaction as defined calls for from about 1.05 to 1.7 moles of alkali metal promoter, this same range applied to the esterifying agent. More than this amount of esterifying agent can be used, if desired, to make absolutely certain that complete re-esterification takes place. To add this extra precaution, the amount of re-esterifying agent should be in the range of 1.05 to 2.7 moles of agent.

Following the re-esterification step, the acids (hydrogens) are all converted to the ester form. Lower alcohols, e.g., ethyl alchol, and alkyl formate are also formed during the re-esterification step.

By employing the foregoing re-esterification procedure, it is possible to increase the yield from 5% to 60%. The improved yield which can be gained by using the additional recovery steps will depend upon how much ester replacement by sodium occurs during the initial reaction. For instance, within the given temperature range of 20° C. to 100° C., very little ester replacement occurs below 60° C. Consequently, if the reaction temperature is maintained below 60° C., there will be little advantage to be gained from employing the ion exchange/re-esterification steps. However, if the reaction temperature is allowed to reach temperatures up to 100° C., then the additional embodiment for increased yields may be very desirable. The ester replacement by the sodium ion can be thought of in terms of the following simplified illustration:

By employing this procedure, a compound in excess of 95% purity (by P³¹MR and their layer chromatography) is obtained. Ion exchanging to replace the alkaline earth metal ion by hydrogen leads to the pure hexane polyphosphonic acid.

The preferred alkaline earth metal compounds to react with the ester of hexane polyphosphonic acid in the reaction mixture are calcium chloride and magnesium chloride. Other salts can also be used such as the nitrate and sulfates of calcium and magnesium.

EXAMPLE I

Preparation of a mixture of pentane-5-hydroxy-1,2,3,4-tetraphosphonic acid and pentane-1,2,3,4,5-pentaphosphonic acid and sodium salts thereof The reaction apparatus consists of a two liter, three-neck round bottom flask which is fitted with a mechanical stirrer in the center neck; an offset additional funnel leading to an Allihn condenser (vented to the atmosphere through a gas outlet tube) in a side neck; and in the opposite neck, a Y adapter leading to a thermometer and a gas inlet tube. All equipment is baked at 110° C. for 30 minutes prior to assembly, and a stream of dry nitrogen is bled through the apparatus during the reaction.

Dispersed sodium (23.0 g., 1 mole) in 500 cc. of toluene is placed in the reaction flask and 345 g. (2.5 moles) of diethyl hydrogen phosphite are slowly added. The temperature of the reaction mixture is maintained at 25–30°

C. by external cooling. After addition of the diethyl phosphite is complete, addition of 40.0 g. (0.5 mole) of penta-2,4-diyne-1-ol (HC≡C—C≡C—CH$_2$OH) is begun. The unsaturated alcohol is added in 5.0 g. portions, allowing 15 minutes between additions. The resulting solution, after complete addition of reagents, is heated to 70° C. and stirred for 2 hours.

The toluene solvent and excess diethyl hydrogen phosphite are then removed by distilling at 50–75° C. under a pressure of 0.5 mm. Hg. An oily residue remains which is ion-exchanged with a Dowex 50W–X8 hydrogen cation exchange resin and the water removed to leave a brown oil. This oil is re-esterified by refluxing with excess triethyl orthoformate, and the resulting solution again distilled at 50–75° C. 0.5 mm. pressure.

The pot residue is converted to the acid form by refluxing for 4 hours with concentrated hydrochloric acid (HCl). Excess HCl and water is removed leaving a brown oil which is dissolved in water and titrated to a pH of 7 with NaOH solution. Addition of an excess of calcium chloride, CaCl$_2$, to this solution precipitates white calcium salts of pentane-5-hydroxy-1,2,3,4-tetraphosphonic acid and pentane-1,2,3,4,5-pentaphosphonic acid. The solid calcium salt precipitate is collected by centrifugation. This solid precipitate is washed with 300 cc. of hot water and then ion-exchanged as before. The resulting clear acid solution is titrated to a pH of 9 and removal of the water allows the isolation of a mixture of hexasodium pentane-5-hydroxy-1,2,3,4-tetraphosphonate and heptasodium pentane-1,2,3,4,5-pentaphosphonate in about a 50% yield.

EXAMPLE II

Preparation of decaethyl ester of pentane-1,2,3,4,5-pentaphosphonic acid

The reaction apparatus is the same as described in Example I. Dispersed sodium (23.0 g., 1 mole) in 500 cc. of toluene is placed in the reaction flask and 345 g. of diethyl hydrogen phosphite is slowly added at 25–30° C. (external cooling). Addition of 40.0 g. (0.5 mole) of penta-2,4-diyne-1-ol is begun, this material being added in 5 g. portions, allowing 15 minutes between additions. The resulting solution after addition is complete is heated to 70° C. for 2 hours. Then 0.1 mole of sodium diethyl phosphite in 100 cc. of toluene is added and heating is continued at 70° C. for an additional hour. A second 0.1 mole portion of sodium diethyl phosphite is added, the temperature raised to 100° and maintained there for 2 hours.

The reaction mixture is now predominantly the decaethyl ester of pentane-1,2,3,4,5-pentaphosphonic acid. The heptasodium salt of pentane-1,2,3,4,5-pentaphosphonic acid can be isolated in about a 50% yield via the work-up procedure outlined in Example I.

EXAMPLE III

Preparation of a mixture of hexane-1,6-dihydroxy-2,3,4,5-tetraphosphonic acid, hexane-1-hydroxy-2,3,4,5,6-pentaphosphonic acid, hexane - 1,2,3,4,5,6 - hexaphosphonic acid and sodium salts thereof The reaction apparatus was the same as that described in Sample I. It was also dried in the same manner prior to use.

A dispersion of 23.0 g. of sodium (1 mole) in 300 cc. of toluene was prepared and reacted at 25° C. with 345 g. of diethyl phosphite (2.5 mole), to form one mole of sodium diethyl phosphite. When all the sodium had reacted, addition of 30.0 g. (0.27 mole) of hexa-2,4-diyne-1,6-diol (HOCH$_2$—CH≡C—C≡C—CH$_2$OH) was begun. The solid material was added in 6 portions of 5 g. each, the temperature rising to about 60° C. after each addition. After the reaction mixture had cooled to 45° C. each successive 5 g. portion was added. The resulting solution was then stirred at 60° C. for 12 hours. The temperature of the reaction mixture was raised to 70° C. and 0.1 mole of sodium diethyl phosphite, prepared from sodium and diethyl phosphite as described above, in toluene solution was slowly added. Heating was continued at 70° C. for 2 hours and another 0.1 mole of sodium diethyl phosphite was added. The solution was then heated to 100° C. for 2.5 hours.

Isolation of the product.—The solvent was removed from the above reaction mixture by flash evaporation leaving a dark oil. This oil was passed through a Dowex 50W–X8 hydrogen cation-exchange resin to remove sodium ions, and the water removed from the resulting acid solution. The oil which remained was re-esterified by refluxing with 175 g. of triethyl orthoformate. Distillation of the re-esterified mixture yielded a low-boiling fraction, B.P. (50 microns) 25–85° C., and a viscous pot residue. The low boiling materials were discarded. The pot residue was refluxed for 3.5 hours with a large excess of concentrated HCl, to convert the phosphonate esters to acids.

The excess HCl and water were removed by distillation, leaving a purple oil residue. The oil was re-dissolved in water and 236 g. of CaCl$_2$.2H$_2$O was added (1.6 mole). Upon titration of this solution to pH=7 with NaOH a salt precipitated. This salt was removed by centrifugation, washed twice with 500 cc. portions cold water and once with 500 cc. of hot water; and ion-exchanged to remove calcium ions. The resulting acid solution was reduced in volume and NaOH added to adjust pH to 7. Then a solution of CaCl$_2$ in water was added dropwise causing the formation of a precipitate. Addition was continued until no further precipitation occurred, and the solid was collected by centrifugation. This solid was washed once with 500 cc. of cold water and once with 500 cc. hot water. After drying it weighed 93 g. and analysis showed the absence of sodium. This salt was ion-exchanged to the free acid which was converted to the sodium salt by titration to pH=9 with NaOH. A white solid remained when the water was removed which contained equal amounts of the sodium salts of hexane-1,6-dihydroxy-2,3,4,5-tetraphosphonic acid, hexane-1-hydroxy-2,3,4,5,6-pentaphosphonic acid and, hexane-1,2,3,4,5,6-hexaphosphonic acid.

EXAMPLE IV

Preparation of a mixture of sodium salts of hexane-1,6-dihydroxy-2,3,4,5-tetraphosphonic acid, hexane-1-hydroxy-2,3,4,5,6-pentaphosphonic acid, and hexane-1,2,-3,4,5,6-hexaphosphonic acid The reaction apparatus was the same as that described in Example I.

A dispersion of 12.6 g. sodium (0.55 mole) was prepared in 300 cc. toluene, and 175 g. diethyl hydrogen phosphite was added slowly with cooling adequate to maintain the temperature at 25–30° C., to form sodium diethyl phosphite. When all the diethyl phosphite had been added, the solution was stirred at 25° C. for 0.5 hour. This solution was then slowly added to a slurry of 19.5 g. of hexa-2,4-diyne-1,6-diol (0.18 mole) in 100 cc. toluene. The temperature was maintained at 25° C. throughout this addition. The resulting solution was slowly heated to 70° C. and maintained there for 4 hours. After allowing the solution to return to 25° C., 3.5 g. sodium hydride (0.145 mole) was added in a toluene slurry. This solution was then heated to 100° C. and maintained there for 4 hours.

Following the isolation procedure described in Example III, a sodium salt product was obtained from water solution at pH 9.5. The product consisted of equal amounts of sodium hexane - 1,6 - dihydroxy-2,3,4,5-tetraphosphonate, sodium hexane-1-hydroxy-2,3,4,5,6-pentaphosphonate, and sodium hexane-1,2,3,4,5,6-hexaphosphonate.

*Analysis.*—Calc. for an average composition of C$_6$H$_{10}$O$_{16}$P$_5$Na$_8$ (percent): C, 10.6; H, 1.5; P, 22.9; Na, 27.2. Found (percent): C, 10.7; H, 1.9; P, 21.8; Na, 26.8.

EXAMPLE V

Preparation of dodecaethyl ester of hexane-1,2,3,4,5,6-hexaphosphonic acid

The mixture of sodium salts of example III is converted to the acid by ion-exchanging on Dowex 50W–X8 hydrogen cation exchange resin. The resulting solution is evaporated to a thick oil which is converted to an ester form by refluxing with an excess of triethyl orthoformate. This ester mixture is reacted with 3 equivalents of sodium diethyl phosphite at 100° for 2 hours.

The reaction product is predominantly dodecaethyl ester of hexane-1,2,3,4,5,6-hexaphosphonic acid. This material can be converted to the acid, purified, and isolated as the sodium salt by the procedure described in Example I.

EXAMPLE VI

Preparation of a mixture of odecaethyl ester of heptane-7-hydroxy-1,2,3,4,5,6-hexaphosphonic acid and tetradecaethyl ester of heptane-1,2,3,4,5,6,7-heptaphosphonic acid The reaction apparatus is identical to that described in Example I. Sodium (23.0 grams, 1 mole) is dispersed in 500 cc. of toluene, and 583,0 g. of hydrogen diethyl phosphite (3.5 mole) is slowly added to the dispersion at a temperature of 25–30° C. When the addition is complete the resulting solution is stirred for ½ hour at 25° C. Then addition of 52 g. hepta-2,4,6-triyne-1-ol (0.5 mole) is begun. Initially 12.0 g. are added and the solution stirred for 15 minutes. Subsequent portions of 10.0 g. are added every 20 minutes thereafter until all 52.0 g. have been consumed. The resulting solution is stirred at 70° for 2 hours.

The reaction mixture consists of approximately equal amounts of a dodecaethyl ester of heptane-7-hydroxy-1,2,3,4,5,6-hexaphosphonic acid and a tetradecaethyl ester of heptance-1,2,3,4,5,6,7-heptaphosphonic acid. A mixture of the corresponding nona- and undecasodium salts, respectively, is isolated by the following procedure outlined in Example I.

EXAMPLE VII

Preparation of tetradecaethyl ester of heptane-1,2,3,4,5,6,7-heptaphosphonic acid A mixture of sodium salts obtained according to Example VI is converted to the acid by ion-exchanging in Dowex 50W–X8 hydrogen cation exchange resin. The resulting acid solution is evaporated to a thick oil which is converted to ester form by refluxing with an excess of triethyl orthoformate. This ester mixture is allowed to react with 2 equivalents of sodium diethylphosphite at 110° C. for 1¾ hours.

The product so obtained is predominantly tetradecaethyl ester of heptane-1,2,3,4,5,6,7-hexaphosphonic acid. This material can be converted to the free acid, purified and isolated or it can be recovered as the sodium salt by the procedure described in Example I.

EXAMPLE VIII

Preparation of a mixture of the dodecaethyl ester of octane-1,8-dihydroxy-2,3,4,5,6,7 - hexaphosphonic acid, the tetradecaethyl ester of octane-8-hydroxy-1,2,3,4,5,6,7 heptaphosphonic acid and the hexadecaethyl ester of octane-1,2,3,4,5,6,7,8-octaphosphonic acid The reaction apparatus described in Example I is employed. A dispersion of 17.25 g. of sodium (0.75 mole) in 500 cc. of toluene is prepared and to this rapidly stirred dispersion is added 276.0 g. of hydrogen diethyl phosphite (2.0 moles). The rate of addition is adjusted such that a medium amount of external cooling can maintain the temperature of the reaction mixture at 25–30° C. After addition of the hydrogen diethyl phosphite is complete the introduction to the reaction mixture of octa-2,4,6-triyne-1,8 - diol (HOCH$_2$C≡C—C≡C—C≡C—CH$_2$OH) is begun. A total of 33.5 g. (0.25 mole) is required, and this amount is added to the reaction mixture in portions such that the temperature of the mixture does not rise above 75° C. during the ensuing exothermic reaction. When addition of the triyne is complete the solution is heated to 80° C. and stirred at that temperature for 1.5 hours.

The reaction is now complete and the mixture consists of equal amounts of fully esterified dodecaethyl octane-1,8 - dihydroxy - 2,3,4,5,6,7 - hexaphosphonate, tetradecaethyl octane - 8 - hydroxy-1,2,3,4,5,6,7-heptaphosphonate, and hexadecaethyl octane-1,2,3,4,5,6,7,8-octaphosphonate, along with some excess hydrogen diethyl phosphite. Purification and recovery of this mixture as corresponding acids is readily performed by employing the work-up procedure described in Example I.

The product is best isolated as a mixture of sodium salts resulting from titration of the acid mixture to pH 9 with NaOH and removal of the solvent. The yield is about 40%.

EXAMPLE IX

Preparation of hexadecaethyl ester of octane-1,2,3,4,5,6,7,8-octaphosphonic acid A mixture of sodium salts prepared according to Example VIII is converted to the acid by ion-exchanging on Dowex 50W–X8 hydrogen cation exchange resin. The resulting acid solution is evaporated to a thick oil which is converted to ester form by refluxing with an excess of triethyl orthoformate. This ester mixture is allowed to react with 3 equivalents of sodium diethylphosphite at 100° C. for 2½ hours.

The product so obtained is predominantly the hexadecaethyl ester of octane-1,2,3,4,5,6,7,8-octaphosphonic acid. This compound is converted to the acid form, purified and isolated or it can be recovered as the sodium salt by the procedures described in Example I.

EXAMPLE X

Preparation of a mixture of the hexadecaethyl ester of nonane-9-hydroxy-1,2,3,4,5,6,7,8 - octaphosphonic acid and the octadecaethyl ester of nonane-1,2,3,4,5,6,7,8,9-nonaphosphonic acid The reaction apparatus described in Example I is employed. With the aid of the high-speed stirrer 4.6 g. of sodium (0.2 mole) are dispersed in 200 cc. of toluene. To this dispersed sodium is slowly added 138 g. of diethyl hydrogen phosphite (1 mole). The reaction leading to sodium diethyl phosphite is exothermic requiring external cooling to maintain the reaction temperature at 25–30° C. When all the diethyl hydrogen phosphite has been added and the solution has clarified, 12.8 g. of nona-2,4, 6,8-tetrayne-1-ol HC≡C—C≡C—C≡C—C≡C—CH$_2$OH (0.1 mole) is slowly dropped into the stirred reaction mixture. The temperature is allowed to rise to 70–80° C. during this addition. When all the tetrayne has been added, external heat is applied to the mixture adequate to maintain the temperature at 75° C. for 2.5 hours.

The reaction mixture consists of an equal mixture of hexadecaethyl ester of nonane-9-hydroxy-1,2,3,4,5,6,7,8-octaphosphonic acid, octahexaethyl ester of nonane 1,2, 3,4,5,6,7,8,9-nonaphosphonic acid and small amounts of hydrogen diethyl phosphite. A procedure for removal of the excess phosphite and subsequent conversion of the product esters to the corresponding free acids and purified sodium salts is described in Example I. The yield is generally about 45%.

EXAMPLE XI

Preparation of the octadecaethyl ester of nonane-1,2,3,4,5,6,7,8,9-nonaphosphonic acid A mixture of sodium salts prepared according to Example X is converted to the acid by ion-exchanging on Dowex 50W–X8 hydrogen cation exchange resin. The resulting acid solution is evaporated to a thick oil which is converted to ester form by refluxing with an excess of triethyl orthoformate. This ester mixture is allowed to react with 2 equivalents of sodium diethylphosphite at 105° for 2 hours.

The product so obtained is predominantly the octadecaethyl ester of nonane - 1,2,3,4,5,6,7,8,9 - nonaphosphonic acid. This compound is converted to the acid form, purified and isolated or it can be recovered as the sodium salt by the procedure described in Example I.

EXAMPLE XII

Preparation of a mixture of decane-1,10-dihydroxy-2,3,4,5,6,7,8,9 - octaphosphonic acid, decane - 10 - hydroxy-1,2,3,4,5,6,7,8,9 - nonaphosphonic acid and decane-1,2,3,4,5,6,7,8,9,10-decaphosphonic acid The reaction apparatus is the same as that described in Example I. A dispersion of 0.5 mole of sodium (11.5 g.) in 300 cc. of toluene is prepared and to this dispersion is added 2.0 moles of hydrogen diethyl phosphite (276.0 g.) at 25–30° C.

To the resulting solution is added 33.6 g. of deca-2,4,6,8-tetrayne-1,10-diol. Rate of addition of the tetrayne is adjusted so that the reaction temperature does not rise above 75° C. during the addition. The resulting mixture is now heated to 80° C. and maintained at this temperature for 2 hours.

The reaction product now mainly of a small amount of hydrogen diethyl phosphite and a fully esterified mixture of equal parts of decane-1,10-dihydroxy-2,3,4,5,6,7,8,9 - octaphosphonic acid, decane - 10 - hydroxy-1,2,3,4,5,6,7,8,9 - nonaphosphonic acid, and decane-1,2,3,4,5,6,7,8,9,10 - decaphosphonic acid results. A procedure for the removal of the excess phosphite and subsequent conversion of the product esters to the corresponding free acids and the purified sodium salts is described in Example I. The yield is generally about 50%.

EXAMPLE XIII

Preparation of the eicosaneethyl ester of decane-1,2,3,4,5,6,7,8,9,10-decaphosphonic acid A mixture of sodium salts prepared according to Example XII is converted to the corresponding acids by ion exchanging on Dowex 50W–X8 hydrogen cation exchange resins. The resulting acid solution is evaporated to a thick oil which is converted to ester form by refluxing with an excess of triethylorthoformate. This ester mixture is allowed to react with 3 equivalents of sodium diethylphosphite at 95° C. for 2½ hours.

The product obtained is predominantly the eicosylethyl ester of decane-1,2,3,4,5,6,7,8,9,10-decaphosphonic acid. This compound is converted to the acid form, purified and isolated or it can be recovered as the sodium salt by the procedure described in Example I.

Another embodiment of the present invention is the marked detergency building property possessed by the novel aliphatic polyphosphonate compounds described above. The magnitude of the cleaning power over previously known organic and inorganic detergency builder compounds was totally unexpected. As a result of this discovery, one of the more important embodiments of the present invention is a detergent composition which contains the aliphatic polyphosphonate compound as a builder compondent in the complete formulation.

Built detergent compositions ranging from lightly built to medium built to heavily built have been available for several years. These compositions most generally are in the form of solids and liquids and are used for light, medium, or heavy duty laundering uses. The meaning of the terms lightly built, medium built, and heavily built are derived from the relative amount of builder which is present in the total formulation; and the concept behind built detergent compositions is based on the knowledge that when certain substances are added to the active detergent component or components of washing compositions, an increase in cleaning ability or whiteness maintenance, or both, is obtained, even though the washing solution used may contain less of the active detergent. Substances capable of producing this effect are known as builders, and it is in this context that the aliphatic polyphosphonate compounds of the present invention are those used for washing fine fabrics or lightly soiled fabrics. Milder conditions are generally used in light duty applications, such as, for instance, cool or warm water and only slight wringing or agitating. Dishwashing compositions can also be considered as light duty detergent compositions. Heavy duty laundering compositions, on the other hand, are those intended for washing heavily soiled fabrics such as are generally found in an ordinary household wash. Medium duty laundering compositions can alternatively be used for dishwashing, fine fabric laundering, or even for washing fairly heavily soiled fabrics.

It is surprising that the compounds of the present invention find such wide applications as those listed above. It was equally as surprising, however, to discover that in formulating detergent compositions described above, the active detergent portion of the complete compositions could be virtually any of the known or commercially available surface active detergent compounds. In its broadest terms, therefore, this embodiment of the present invention contemplates a detergent composition comprising an active detergent portion which can be any surface active compound having useful detergent properties and an effective amount of a builder comprised of the aliphatic polyphosphonate compounds described herein.

It is to be noted that while an active detergent or a mixture of detergent compounds represent an essential and indispensable ingredient in the detergent compositions presently being contemplated, the major discovery resides in the useful builder properties of the aliphatic vicinal polyphosphonate compounds.

According to the present invention, a detergent composition should contain an active detergent ingredient and an aliphatic vicinal polyphosphonate builder of the present invention in a ratio, by weight of from about 2:1 to about 1:10 and, preferably, in a weight ratio of detergent to builder of from 1:1 to about 1:6. It is customary to speak of the ingredients in detergent compositions as being by weight. By way of example, a detergent composition prepared according to the present invention in which the active to builder ratio is about 2:1 or 1:1 on a weight basis is especially useful as a dishwashing composition or a fine fabric laundering composition. A detergent composition comprising active detergent to builder ratio of 1:1.5 or 1:1.9 has excellent performance characteristics for washing lightly soiled items in an ordinary household wash. Yet further by way of illustration, heavily soiled fabrics are best laundered with detergent compositions in which the active detergent to builder ratio is from 1:2 to about 1:10.

It will be seen, therefore, that in practicing the present invention, it is only necessary to mix at least one surface active detergent compound having the desired sudsing, cleaning, mildness characteristics and the like, with an effective amount of an aliphatic vicinal polyphosphonate builder compound of the present invention in the useful by-weight proportions set forth above.

The active detergent ingredients can include anionic, nonionic, ampholytic and zwitterionic detergent compounds, or mixtures of compounds selected from these general classes of detergents. Each of these classes is illustrated at length as follows:

(A) Anionic soap and non-soap synthetic detergents

This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Naphthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap.

This class of detergents also includes water-soluble salts, particularly the alkali metal salts of organic sulfuric reaction products having in their molecular structure an alkyl radical containing from about 8 to about 22 carbon atoms and a sulfonic acid or sulfuric acid ester radical. (Included in the term alkyl is the alkyl portion of higher acyl radicals.) Examples of this group of synthetic detergents which form a part of the preferred built detergent compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, in straight chain or branched chain configuration, e.g., those of the type described in United States Letters Patents Nos. 2,220,099 and 2,477,383 (especially valuable are linear straight chain alkyl benzene sulfonates in which the average of the alkyl groups is about 13 carbon atoms abbreviated hereinafter as $C_{13}$LAS); sodium alkyl glyceryl ether sulfonates, especially those ethers of higher alcohols derived from tallow and coconut oil; sodium coconut oil fatty acid monoglyceride sulfonates and sulfates; sodium or potassium salts of sulfuric acid esters of the reaction product of one mole of a higher fatty alcohol (e.g., tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain about 8 to about 12 carbon atoms.

Additional examples of anionic non-soap synthetic detergents which come within the terms of the present invention are the reaction product of fatty acids esterified with isethionic acid and neutralized with sodium hydroxide where, for example, the fatty acids are derived from coconut oil; sodium or potassium salts of fatty acid amide of methyl tauride in which the fatty acids, for example, are derived from coconut oil. Other anionic synthetic detergents of this variety are set forth in United States Letters Patents 2,486,921; 2,486,922; and 2,396,278.

Still other anionic synthetic detergents include the class designated as succinamates. This class includes such surface active agents as disodium N-octadecylsulfo succinamate; tetrasodium N - (1,2 - dicarboxyethyl) - N-octadecyl sulfo-succinamate; diamyl ester of sodium sulfosuccinic acid; dihexyl ester of sodium sulfosuccinic acid; dioctyl ester of sodium sulfosuccinic acid.

Anionic phosphate surfactants are also useful in the present invention. These are surface active materials having substantial detergent capability in which the anionic solubilizing group connecting hydrophobic moieties is an oxy acid of phosphorus. The more common solubilizing groups, of course, are —$SO_4H$, —$SO_3H$, and —$CO_2H$. Alkyl phosphate esters such as (R—O)$_2$PO$_2$H and ROPO$_3$H$_2$ in which R represents an alkyl chain containing from about 8 to about 20 carbon atoms are useful.

These esters can be modified by including in the molecule from one to about 40 alkylene oxide units, e.g., ethylene oxide units. Formulae for these modified phosphate anionic detergents are in which R represents an alkyl group containing from about 8 to 20 carbon atoms, or an alkylphenly group in which the alkyl group contains from about 8 to 20 carbon atoms, and M represents a soluble cation such as hydrogen, sodium, potassium, ammonium or substituted ammonium; and in which $n$ is an integer from 1 to about 40.

A specific anionic detergent which has also been found excellent for use in the present invention is described more fully in the U.S. Pat. No. 3,332,880 of Phillip F. Pflaumer and Adriaan Kessler, issued July 25, 1967, titled Detergent Composition. This detergent comprises by weight from about 30% to about 70% of Component A, from about 20% to about 70% of Component B, and from about 2% to about 15% of Component C, wherein:

(a) Said Component A is a mixture of double-bond positional isomers of water soluble salts of alkene-1-sulfonic acids containing from about 10 to about 24 carbon atoms, said mixture of positional isomers including about 10% to about 25% of an alpha-beta unsaturated isomer, about 30% to about 70% of a beta-gamma unsaturated isomer, about 5% to about 25% of a gamma-delta unsaturated isomer, and about 5% to about 10% of a delta-epsilon unsaturated isomer;

(b) Said Component B is a mixture of water soluble salts of bifunctionally-substituted sulfur-containing saturated aliphatic compounds containing from about 10 to about 24 carbon atoms, the functional units being hydroxy and sulfonate radicals with the sulfonate radical always being on the terminal carbon and the hydroxyl radical being attached to a carbon atom at least two carbon atoms removed from the terminal carbon atom, at least 90% of the hydroxy radical substitutions being in the 3, 4, and 5 positions; and (c) Said Component C is a mixture comprising from about 30–95% water soluble salts of alkene disulfonates containing from about 10 to about 24 carbon atoms, and from about 5% to about 70% water soluble salts of hydroxy disulfonates containing from about 10 to about 24 carbon atoms, said alkene disulfonates containing a sulfonate group attached to a terminal carbon atom, and a second sulfonate group attached to an internal carbon atom not more than about six carbon atoms removed from said terminal carbon atom, the alkene double bond being distributed between the terminal carbon atom and about the seventh carbon atom, said hydroxy disulfonates being saturated aliphatic compounds having a sulfonate radical attached to a terminal carbon, a second sulfonate group attached to an internal carbon atom not more than about six carbon atoms removed from sid terminal carbon atom, and a hydroxy group attached to a carbon atom which is not more than about four carbon atoms removed from the site of attachment of said second sulfonate group.

(B) Nonionic synthetic detergents

Nonionic synthetic detergents may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

For example, a well known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

(2) Those derived from the condensation of ethylene oxide with the product resulting from the reaction of propylene oxide and ethylene diamine. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000, are satisfactory.

(3) The condensation product of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

(4) Nonionic detergents include nonyl phenol condensed with either about 10 or about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl) lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-iso-octylphenol condensed with 15 moles of ethylene oxide.

(5) A detergent having the formula $R^1R^2R^3N \rightarrow O$ (amine oxide detergent) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and 0 ether linkages, and each $R^2$ and $R^3$ are selected from the group consisting of alkyl radicals and hydroxyalkyl radicals containing from 1 to about 3 carbon atoms;

Specific examples of amine oxide detergents include:

dimethyldodecylamine oxide
dimethyltetradecylamine oxide
ethylmethyltetradecylamine oxide
cetyldimethylamine oxide
dimethylstearylamine oxide
cetylethylpropylamine oxide
diethyldodecylamine oxide
diethyltetradecylamine oxide
dipropyldodecylamine oxide
bis-(2-hydroxyethyl)dodecylamine oxide
bis-(2-hydroxyethyl)-3-dodecoxy-1-hydroxypropylamine oxide
(2-hydroxypropyl)methyltetradecylamine oxide
dimethyloleyamine oxide
dimethyl-(2-hydroxydodecyl)amine oxide and the corresponding decyl, hexadecyl and octadecyl homologs of the above compounds.

(6) A detergent having the formula $R^1R^2R^3P \rightarrow O$ (phosphine oxide detergent) wherein $R'$ is an alkyl group containing from about 10 to about 28 carbon atoms, from 0 to about 2 hydroxy groups and from 0 to about 5 ether linkages, there being at least one moiety of $R'$ which is an alkyl group containing from about 10 to about 18 carbon atoms and 0 ether linkages, and each of $R^2$ and $R^3$ are selected from the group consisting of alkyl radicals and hydroxyalkyl radicals containing from 1 to about 3 carbon atoms.

Specific examples of the phosphine oxide detergents include:

dimethyldodecylphosphine oxide
dimethyltetradecylphosphine oxide
ethylmethyltetradecylphosphine oxide
cetyldimethylphosphine oxide
dimethylstearylphosphine oxide
cetylethylpropylphosphine oxide
diethyldodecylphosphine oxide
diethyltetradecylphosphine oxide
dipropyldodecylphosphine oxide
bis-(hydroxymethyl)dodecylphosphine oxide
bis-(2-hydroxyethyl)dodecylphosphine oxide
(2-hydroxypropyl)methyltetradecylphosphine oxide
dimethyloleylphosphine oxide, and
dimethyl-(2-hydroxydodecyl)phosphine oxide and the corresponding decyl, hexadecyl, and octadecyl homologs of the above compounds.

(7) A detergent having the formula

(sulfoxide detergent) wherein $R^1$ is an alkyl radical containing from about 10 to about 28 carbon atoms, from 0 to about 5 ether linkages and from 0 to about 2 hydroxyl substituents at least one moiety of $R^1$ being an alkyl radical containing 0 ether linkages and containing from about 10 to about 18 carbon atoms, and wherein $R^2$ is an alkyl radical containing from 1 to 3 carbon atoms and from one to two hydroxyl groups.

octadecyl methyl sulfoxide
dodecyl methyl sulfoxide
tetradecyl methyl sulfoxide
3-hydroxytridecyl methyl sulfoxide
3-methoxytridecyl methyl sulfoxide
3-hydroxy-4-dodecoxybutyl methyl sulfoxide
octadecyl 2-hydroxyethyl sulfoxide
dodecylethyl sulfoxide

(C) Ampholytic synthetic detergents

Ampholytic synthetic detergents can be broadly described as derivatives of aliphatic or aliphatic derivatives of heterocyclic secondary and tertiary amines, in which the aliphatic radical may be straight chain or branched and where one of the aliphatic substituents contains from about 8 to 18 carbon atoms and at least one contains an anionic water-solubilizing group, e.g., carboxy, sulfo, sulfato, phosphato, or phosphono. Examples of compounds falling within this definition are sodium 3-(dodecylamino)-propionate sodium 3-(dodecylamino)propane-1-sulfonate sodium 2-(dodecylamino)ethyl sulfate sodium 2-(dimethylamino)octadecanoate disodium 3-(N-carboxymethyl-dodecylamino)propane-1-sulfonate disodium 2-(oleylamino)ethyl phosphate disodium 3 - (N - methyl-hexadecylamino)propyl-1-phosphonate disodium octadecyl-iminodiacetate sodium 1-carboxymethyl-2-undecyl-imidazole disodium 2-[N - (2-hydroxyethyl)octadecylamino] ethyl phosphate and sodium N,N-bis-(2-hydroxyethyl)-2-sulfato-3-dodecoxypropylamine (D) Zwitterionic synthetic detergents

Zwitterionic synthetic detergents can be broadly described as derivatives of aliphatic quaternary ammonium and phosphonium or tertiary sulfonium compounds, in which the cationic atom may be part of a heterocyclic ring, and in which the aliphatic radical may be straight chain or branched, and wherein one of the aliphatic substituents contains from about 3 to 18 carbon atoms, and at least one aliphatic substituent contains an anionic water-solubilizing groups, e.g., carboxy, sulfo, sulfato, phosphato, or phosphono. Examples of compounds falling within this definition are 3-(N,N-dimethyl-N-hexadecylammonio)-2-hydroxypropane-1-sulfonate

3 - (N,N - dimethyl - N - hexadecylammonio)propane-1-sulfonate

2-(N,N-dimethyl-N-dodecylammonio)acetate

3-(N,N-dimethyl-N-dodecylammonio)propionate

2-(N,N-dimethyl-N-octadecylammonio)-ethyl sulfate

2-(trimethylammonio)ethyl dodecyl-phosphonate ethyl 3-(N,N-dimethyl-N-dodecylammonio)-propylphosphonate

3-(P,P-dimethyl-P-dodecylphosphonio)-propane - 1 - sulfonate

2 - (S - methyl - S - tert. - hexadecyl - sulfonio)ethane-1-sulfonate

3-(S-methyl-S-dodecylsulfonio)-propionate sodium 2-(N,N-dimethyl-N-dodecylammonio) ethyl dodecyl-phosphonate

4-(S-methyl-S-tetradecylsulfonio)butyrate

1-(2-hydroxyethyl)-2-undecyl-imidazolium-1-acetate 2-(trimethylammonio)-octadecanoate and 3 - (N,N - bis - (2 - hydroxyethyl) - N - octodecyl-ammonio)-2-hydroxypropane-1-sulfonate.

Some of these detergents are described in the following U.S. Pats.: 2,129,264; 2,178,353; 2,774,786; 2,813,898; and 2,828,332.

A detergent composition prepared according to the present invention contains as essential ingredients (a) a detergent ingredient and (b) a builder ingredient. In simplest terms, a composition can contain a single detergent compound and a single builder compound. On the other hand, it frequently is desirable to formulate a detergent composition in which the active detergent portion consists of mixtures of detergent compounds selected from the foregoing classes. Thus, for example, the active ingredient can consist of a mixture of two or more anionic detergents; or, by way of another example, the active detergent can be a ternary mixture of two anionic detergents and a zwitterionic detergent.

The part of the complete formulation that functions as a builder can likewise be composed of a mixture of builder compounds. For example, the aliphatic vicinal polyphosphonate compounds described herein can be mixed together with other water-soluble inorganic alkaline builder salts such as sodium tripolyphosphate or potassium pyrophosphates. Another example is a binary mixture consisting of an aliphatic vicinal polyphosphonate compound of the present invention and a water-soluble organic builder salt such as water-soluble salts of nitrilotriacetic acid, ethylenediaminetetraacetic acid, ethane-1-hydroxy-1, 1-diphosphonic acid, ethane-1-hydroxy-1,1,2-triphosphonic acid. Still further, the builder component of a complete formulation can consist of ternary mixtures of these several types of builder compounds.

Water-soluble inorganic alkaline builder salts which can be used in this invention in combination with the novel aliphatic vicinal polyphosphonate compounds described herein are alkali metal carbonates, borates, phosphates, polyphosphates, bicarbonates and silicates. Ammonium, substituted ammonium, and amine salts of these materials can also be used. Specific examples of suitable salts are sodium tripolyphosphate, sodium carbonate, sodium tetraborate, sodium and potassium pyrophosphate, sodium and ammonium bicarbonate, potassium tripolyphosphate, sodium hexametaphosphate sodium sesquicarbonate, sodium orthophosphate and potassium bicarbonate.

Examples of suitable organic water-soluble organic alkaline sequestrant builder salts which can be used mixed with the aliphatic vicinal polyphosphonate compounds of this invention are alkali metal (sodium, potassium, lithium), ammonium or substituted ammonium, aminopolycarboxylates, e.g., the above mentioned sodium and potassium ethylenediaminetetraacetate, sodium and potassium N-(2-hydroxyethyl)-ethylenediaminetriacetates, sodium and potassium nitrilotriacetates and sodium, potassium and triethanolammonium N-(2-hydroxyethyl)-nitrilodiacetates, sodium amino tri(methylenephosphonate). The alkali metal salts of phytic acid, e.g., sodium phytate, are also suitable as organic alkaline sequestrant builder salts. Certain other organic builders which can be used in admixture with the aliphatic vicinal polyphosphonates described herein are water-soluble salts of ethane-1-hydroxy-1,1-diphosphonic acid, ethane-1-hydroxy-1,1,2-triphosphonic acid, methylene diphosphonic acid, and the like.

The specific action of the builder mixtures of this invention will vary to some extent depending upon the ratio of active detergent to builder in any given detergent composition. There will be considerable variation in the strengths of the washing solutions employed by different housewives, i.e., some housewives may tend to use less or more of the detergent compositions than will others. Moreover, there will be variations in temperature and in soil loads as between washing operations. Further, the degree of hardness of the water used to make up the washing solutions will also bring about apparent differences in the cleaning power and whiteness maintenance results. Finally, different fabrics will respond in somewhat different ways to different detergent compositions. The best type of detergent composition for household use would in theory be a composition which accomplishes an excellent cleaning and whiteness maintenance effect under the most diverse cleaning conditions. The built detergent compositions of this invention are especially valuable in this respect.

The builder mixtures taught herein are very efficient, and, in general, can be used to permit the attainment of equal detergency with a smaller total quantity of builder in relation to the total quantity of active detergent ingredient.

The built detergent compositions of the present invention can be formulated and prepared into any of the several commercially desirable solid and liquid forms including, for example bars, granules, flakes, tablets, and water-based and alcohol-based liquid detergents, and the like. According to one embodiment of the present invention, solid detergent compositions are prepared containing an active detergent (sole active or a mixture of detergents) and a builder (single compound or a mixture) in the by weight ratio (detergent to builder) of about 2:1 to about 1:10; and preferably from about 1:1 to about 1:6. A special embodiment of this invention is a built liquid detergent composition containing an active detergent and a builder in the by weight ratio (detergent to builder) of 3:1 to about 1:10; preferably 2:1 to about 1:3. The potassium salts of the aliphatic vicinal polyphosphonates are especially useful in liquid formulations due to the increased solubility characteristics of potassium over sodium.

Liquid detergent compositions generally present special problems to the formulator in view of the peculiarities inherent in aqueous systems and the special requirements of solubility of the ingredients, and more especially, their physical and chemical stability in such medium. It is well known, for instance, that sodium tripolyphosphate, which is outstanding in its behavior in granular compositions, is generally regarded as being unsuited as a sole builder for built liquid detergents. It has a marked propensity to hydrolyze the lower forms of phosphate compounds which are less desirable builders. As a practical matter, therefore, it has been necessary to use a more stable form of a phosphate builder, i.e., pyrophosphate, notwithstanding the fact that the pyrophosphate is a relatively inferior detergency builder than tripolyphosphate. The aliphatic vicinal polyphosphonate compounds solve this particular problem because they are, at the same time, much better builders than tripolyphosphates while being hydrolytically stable. In view of the increasing acceptance by the general public of built liquid detergent compositions for virtually all washing and cleaning situations including laundering and dishwashing, it is a very significant contribution of this invention that an improved built liquid detergent product is made possible that will far outperform known liquid detergents while at the same time being free of the troublesome problem of stability.

Built liquid detergents are usually water based or have a mixture of water and alcohol in the liquid vehicle. Such liquid vehicles can be satisfactorily employed in formulating a composition according to the present invention. Accordingly, a sample built liquid detergent composition of this invention can consist essentially of detergent ingredients (a single detergent or a mixture of detergents) and an aliphatic vicinal polyphosphonate containing builder ingredients (either as a single builder or in admixture with other builders), with the balance of the composition to 100% being a liquid vehicle such as water or a water alcohol mixture, and the like.

The built detergent compositions of the present invention perform at their maximum level in a washing solution which has a pH in the range of from about 8 to about 12. Within this broad range, it is preferred to operate at a pH of from about 9 to 11. The detergent and the builder can be neutralized to a degree sufficient to insure that this pH prevails in any washing solution. If desired, other alkaline materials can be added to the complete formulation to provide for any pH adjustments desired. A preferred embodiment is to have the detergent composition whether in solid or liquid form provide a pH in the aforementioned ranges at the usual recommended usage levels.

In a finished detergent formulation, there can be present other materials which make the product more effective or more aesthetically attractive. The following mentioned only by way of example. A water-soluble medium carboxymethyl cellulose can be added in minor amounts to inhibit soil redeposition. Tarnish inhibitors such as benzotriazole or ethylenethiourea can also be added in amounts up to about 3%. Fluorescers, and brighteners, enzymes, perfumes, coloring agents, while not per se essential in the compositions of this invention, can be added in minor amounts. As already mentioned, an alkaline material or alkali such as sodium or potassium hydroxide can be added as supplementary pH adjusters. Other usual additives include sodium sulfate, sodium carbonate, water, and the like. Corrosion inhibitors are also frequently used. Water-soluble silicates are highly effective corrosion inhibitors and can be added if desired at levels of from about 3% to about 8% by weight of the total composition. Alkali metal, preferably potassium and sodium silicates, are preferred having a weight ratio of $SiO_2:M_2O$ of from about 1.0:1 to 2.8:1. (M refers to sodium or potassium.) Sodium silicate having a ratio of $SiO_2:Na_2O$ of from about 1.6:1 to 2.45:1 is especially preferred.

In the embodiment of this invention which provides for a built liquid detergent, a hydrotropic agent may be found desirable. Suitable hydrotropes are water-soluble alkali metal salts of toluenesulfonate, benzenesulfonate, and alkylene sulfonate. Preferred hydrotropes are potassium or sodium toluenesulfonates. The hydrotrope salt may be added, if desired, at levels up to about 12%. While a hydrotrope will not ordinarily be found necessary, it can be added, if so desired, for any reason such as to function as a solubilizing agent and to produce a product which retains its homogeneity at a low temperature. The following compositions, in which the percentages are by weight, will serve to illustrate, but not limit, the invention. Each of the compositions in the following examples give in solution a pH within the desired range of from about 8 to about 12.

EXAMPLE A

An excellent granular built detergent composition according to this invention has the following formulation:

Percent
Sodium alkyl benzene sulfonate in which the alkyl is a straight chain radical comprised of alkyl groups averaging 13 carbon atoms ___________________ 18
A 1:1:1 molar mixture of sodium hexane-1,6-dihydroxy - 2,3,4,5 - tetraphosphonate, sodium hexane-1-hydroxy-2,3,4,5,6-pentaphosphonate, sodium hexane - 1,2,3,4,5,6 - hexaphosphonate ____________ 50
Sodium sulfate _________________________________ 15
Sodium silicate (ratio of $SiO_2:Na_2O$ of 2:1) ________ 7
Water _________________________________________ 10

This heavily built detergent composition is especially valuable for laundering heavily soiled clothes.

The straight chain dodecyl benzene sodium sulfonate in the preceding composition can be replaced on an equal weight basis by either branched chain dodecyl benzene sodium sulfonate, the dodecyl derived from tetrapropylene, sodium tallow alkyl sulfate, sodium coconut oil alkyl sulfate, sodium olefin sulfonate as described in the specification derived from alpha olefins having an average of 14 carbon atoms in the molecule, or a mixture of straight chain dodecyl benzene sodium sulfonate and sodium tallow alkyl sulfate on an equal weight basis. The mixture of sodium hexane polyphosphonate builder can be replaced by a potassium salt of sodium hexane-1,2,3,4,5,6-hexaphosphonate; a 1:1 mixture of sodium tripolyphosphate and the builder mixture described in Example I above; a 1:1:1 ternary mixture of sodium tripolyphosphate, sodium nitrilotriacetate and sodium heptane-1-hydroxy-2,3,4,5,6,7-hexaphosphonate; a 1:1 mixture of sodium nitrilotriacetate and sodium decane-1,10 dehydroxy-2,3,4,5,6,7,8,9-octaphosphonate; a 1:1 mixture of sodium pentane-1,2,3,4,5 - pentaphosphonate and sodium aminotrimethylene phosphonate).

EXAMPLE B

Another granular detergent composition having outstanding cleaning properties has the following formulation:

Percent
Straight chain dodecyl benzene sodium sulfonate (anionic detergent) ____________________________ 4
Sodium tallow alkyl sulfate (anionic detergent) ____ 4
Dodecyl methyl sulfoxide ________________________ 2
Hydrogenated marine oil fatty acid _______________ 2
A 1:1 mixture of sodium pentane-5-hydroxy-1,2,3,4-tetraphosphonate and sodium pentane-1,2,3,4,5-pentaphosphonate ____________________________ 60
Sodium silicate (ratio of $SiO_2:Na_2O$ of 1.6:1) _____ 10
Sodium sulfate _________________________________ 14
Amylase enzyme ________________________________ .01
Water _________________________________________ 6

In this example, the total active detergent of 10% can be totally the nonionic species. In addition, the 2% dodecyl methyl sulfoxide can be replaced either by an alkylphenol ethylene oxide condensate formed by a condensation reaction between dodecyl phenol and 5 moles of ethylene oxide per mole of dodecyl phenol, or by 3-(dodecyldimethylammonio) - 2 - hydroxy propane-1-sulfonate.

The sodium salt mixture of pentane polyphosphonate builders can be added as the salt mixture or it can be present as the free acid neutralized in situ to any salt form ranging from the monosodium or monopotassium salt to the fully neutralized octasodium or decapotassium salt.

EXAMPLE C

This is also an example of a granular detergent composition of outstanding efficiency.

Percent
Straight chain dodecylbenzene sodium sulfonate [1] (anionic detergent) ____________________________ 20
Sodium octane-1,2,3,4,5,6,7,8-octaphosphonate _____ 49
Sodium silicate (ratio $SiO_2:Na_2O$ of 2:1) _________ 6
Sodium sulfate _________________________________ 14
Water _________________________________________ 11

[1] This detergent compound is also referred to as linear dodecyl benzene sodium sulfonate.

In this example, the anionic detergent can be replaced on an equal weight percentage with a sodium olefin sulfonate as described above in which the olefin sulfonate consists of a mixture of chain lengths ranging from 10 to about 18 carbon atoms.

EXAMPLE D

The following formulation is for a granular detergent composition that is an outstanding detergment composition:

| | Percent |
|---|---|
| Dodecyldimethylamine oxide (nonionic detergent) | 16.0 |
| Sodium nonane-1,2,3,4,5,6,7,8,9-nonaphosphonate | 40.0 |
| Toluene sulfonate | 1.8 |
| Sodium silicate (ratio of $SiO_2:Na_2O$ of 2:1) | 8.0 |
| Sodium sulfate | 2.0 |
| Diethanolamide of coconut fatty acid | 1.9 |
| Protease enzyme (Carlsberg Subtilisin) | .02 |
| Benzotriazole | .02 |
| Balance to 100% water. | |

In this composition, the nonionic detergent can be replaced by tetradecyl dimethyl phosphine oxide, sodium-3-dodecylaminopropionate, sodium-3-dodecylaminopropanesulfonate, 3(N,N - dimethyl - N - hexadecylammonio)-propane-1-sulfonate or 3-(N,N-dimethyl-N-dodecylammonio)-2-hydroxypropane-1-sulfonate. Twenty percent of the builder can be replaced with an equal weight replacement of trisodium nitrilotriacetate.

EXAMPLE E

A liquid detergent which is especially effective in cool water as a heavy duty detergent and has the following composition:

| | Percent |
|---|---|
| 3(N,N - dimethyl - N - hexadecylammonio)-2-hydroxypropane-1-sulfonate) | 12.0 |
| Potassium decane - 1,2,3,4,5,6,7,8,9,10 - decaphosphonate | 20.0 |
| Sodium silicate (ratio of $SiO_2:Na_2O$ of 1.6:1) | 3.8 |
| Potassium toluenesulfonate | 8.5 |
| Sodium carboxymethyl hydroxymethyl cellulose | .3 |
| Fluorescent dye | .12 |
| Perfume | .15 |
| Benzotriazole | .02 |
| Water | 55.11 |

EXAMPLE F

Another light duty built liquid detergent consists of:

| | Percent |
|---|---|
| Sodium salt of sulfuric acid ester of the reaction product of one mole of coconut oil alcohol and 3 moles of ethylene oxide | 11.0 |
| Dodecyldimethylamine oxide | 6.0 |
| Sodium tallow alkyl sulfate | 2.25 |
| Potassium hexane-1,2,3,4,5,6-hexaphosphonate | 12.0 |
| Potassium toluene sulfonate | 5.5 |
| Water | 63.25 |

This composition is especially suited for dishwashing and fine fabric washing situations.

BRIEF DESCRIPTION OF THE DRAWING

Figure 1:
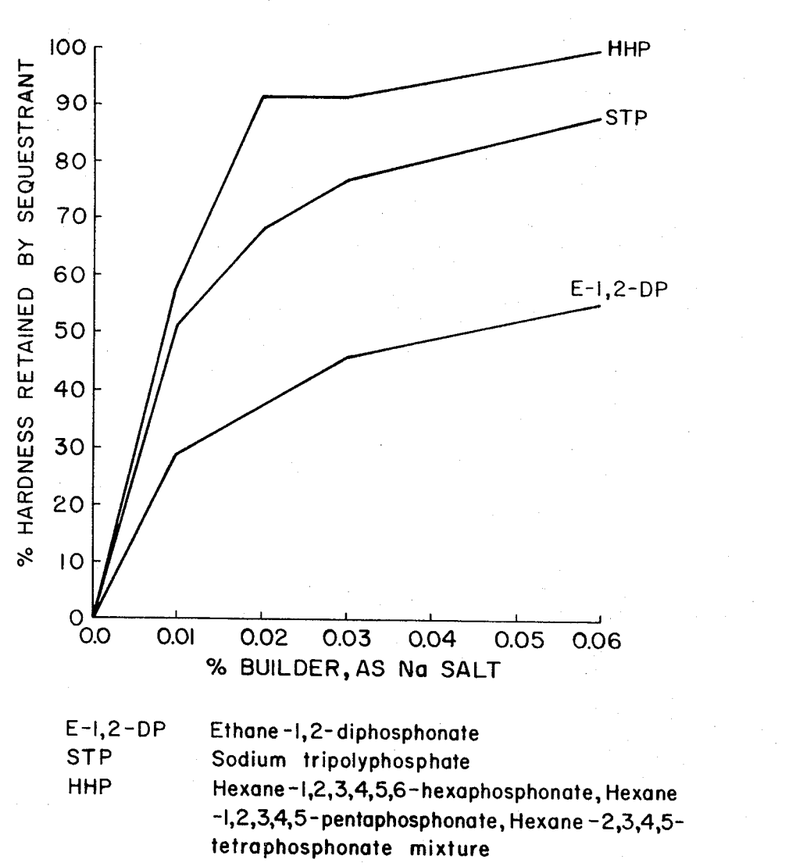

The unexpectedly notable sequestering properties of the aliphatic vicinal polyphosphonate compounds of this invention as represented by a 1:1:1 mixture of sodium hexane-1,6-dihydroxy-2,3,4,5 tetraphosphonate, sodium hexane-1-hydroxy - 2,3,4,5,6 - pentaphosphonate, sodium hexane-1,2,3,4,5,6-hexaphosphonate as shown in the drawing. The test used to discover these properties is called a Swatch-Dip test which measures the relative sequestering ability of a builder by employing a fabric-swatch impregnated with soap and an aqueous solution containing a predetermined level of calcium hardness minerals. Briefly, the procedure calls for preparing the aqueous solution containing the hardness ions, at pH 10, and dipping into it or immersing in it a fabric-swatch which has been impregnated with a measured amount of soap. The swatch remains in the solution for a predetermined amount of time. A measurement is then made to determine the amount of free calcium which has been absorbed by the fabric-swatch. The identical procedure is then repeated but with a predetermined concentration of a sequesterant compound added to the aqueous solution containing the calcium ions. Measurements of adsorbed calcium are again made and comparisons drawn. Differences between the amounts of calcium adsorbed in tests with and without sequestrants, is attributed to the ability of the sequestrant to tie-up or sequester the calcium and thereby decrease the level of free calcium ion concentration available for adsorption by the immersed fabric swatch. A percentage is obtained in this manner called "percent hardness retained by sequestrant." Several tests were conducted in this manner using sodium tripolyphosphate (STP), sodium ethane-1,2-diphosphonate (E–1,2–DP) and sodium salts of the 1:1:1 mixture of hexane polyphosphonic acids mentioned above. This mixture is referred to below as HHP. It can be seen from the drawing that ethane-1,2-diphosphonate reached a maximum percentage of about 56% retained hardness at a concentration of 0.06% in the aqueous solution. At a concentration of 0.03% the level fell to about 46%; at .01%, the figure fell to 29%. Sodium tripolyphosphate by comparison sequestered 88% at 0.06% concentration, 77% at 0.03% concentration, 68% at .02% and 51% at .01%. Below .03% concentration, both STP and E–1,2–DP fall off markedly in their efficiency. However, it can be seen from the drawing that HHP polyphosphonate surpassed STP at .06% in performance (100% vs. 88%) and also exceeded it at lower concentrations. At .02% concentration HHP still provided 91.5% hardness retained; by comparison, at .02% concentration the STP only sequestered 68%. At .01% concentration, HHP polyphosphonates sequestered 57% which exceeds the figure for sodium ethane-1,2-diphosphonate at .06%. This demonstration not only serves to show the superior efficiency of the compounds of the present invention over a well-known sequestrant such as STP but also to demonstrate the surprising improvement over somewhat structurally related compounds, i.e., ethane-1,2-diphosphonate. It is readily apparent that in any given application involving a sequestrant it is possible to attain a desired level of sequestering capacity by using substantially less of an aliphatic vicinal polyphosphonate such as the HHP mixture of the present invention.

A unique property of the alkali metal salts of the aliphatic vicinal polyphosphonic acids of the present invention which makes them specially useful in formulating liquid detergent compositions is the outstanding solubility of these compounds in water. It has been discovered that the alkali metal salts of these acids exhibit solubilities of greater than 50% in water. Unlike other phosphonates with low solubility or with relatively high solubility in a rather narrow pH range, the alkali metal salts of the compounds of this invention are very soluble. This desirable characteristic enhances greatly the versatility of these compounds for various detergent formulations, especially built liquid detergent compositions.

Detergent compositions containing the compounds of the present invention as builders provide marked and unexpected efficiency advantages over traditional classes of builders represented, for instance, by sodium tripolyphosphate (STP) as well as builders discovered and developed within the last few years. This latter class is represented in the following demonstration by ethane-1-hydroxy-1,1-diphosphonates (EHDP) which are described in U.S. Pat. 3,159,581.

An efficiency advantage was discovered and is demonstrated by the following evaluation. A series of detergency tests was conducted which is referred to as a facial swatch test. This test involves a procedure of soiling a cloth swatch with natural soil by attaching a swatch (about 5 inches by 5 inches) to the plunger cup of an electric vibrator massager. Two swatches are soiled from an individual subject by massaging the right and left halves of the face respectively for one minute each. The resulting soiled swatches are randomized into different groups to statistically provide equal numbers of left and right samples. The swatches are then washed, rinsed and graded and the cycle is repeated nine times. The washing step consists of laundering the soiled swatches in an aqueous solution having a temperature of 140° F., a pH of 10, and containing 7 grains hardness.

A mechanical washer is used which is equipped with an agitator and otherwise simulates an ordinary home washing machine. The detergent compositions tested consisted of an active synthetic detergent at a concentration of .03% in the wash water and a builder ingredient at an equal concentration of .03% and/or .06%. As noted above, the builders tested were sodium tripolyphosphate, sodium ethane-1,2-diphosphonate, and the aforementioned sodium hexane polyphosphonate mixture (HHP). Following the washing of the soiled swatches, they were rinsed and dried and then whiteness measurements were made with a commercially available photoelectric reflectometer, i.e., a Hunter Color and Color Difference meter manufactured by Henry A. Gardner Laboratory, Inc. This instrument is designed to distinguish color differences and operates on the tristimulus colorimeter principle. According to this principle, a 45 degree diffuse reflectance of an incident light beam on a test specimen is measured through a combination of green, blue and amber filters. The electrical circuitry of the instrument is so designed that lightness and chromaticity values for the test specimen are read directly. The departure from white ($TiO_2$ being taken as a standard white) of the test specimen is calculated by introducing the lightness and chromaticity values so obtained into a complex formula supplied by the manufacturer. An evaluation of relative whiteness performance compared to a standard detergent composition is thus obtained for the test formulations. A more comprehensive description of this device and its mode of operation appears in Color in Business, Science and Industry by Deane B. Judd, pages 260–262; published by John Wiley & Sons, New York (1952).

The measurements obtained by the foregoing procedure are given below in the table. The efficiency advantage becomes readily apparent from a consideration of these figures. Each of the three builder compounds was tested at a concentration of .03% and E–1,2–DP and STP were tested also at a concentration of .06% in washing the soiled swatches.

The synthetic detergent which was used in each of the following evaluations at a concentration in the wash solutions of .03% was sodium dodecylbenzene sulfonate, the dodecyl group being derived from tetrapropylene.

TABLE II

| Builder | Column I .03% | Column II .06% |
|---|---|---|
| (1) 1:1:1 mixture of sodium hexane-1,6-dihydroxy-2,3,4,5-tetraphosphonate, sodium hexane-1-hydroxy-2,3,4,5,6-pentaphosphonate, sodium hexane-1,2,3,4,5,6-hexaphosphonate | 91.01 | |
| (2) Sodium ethane-1-hydroxy-1,1-diphosphonate (EHDP) | 89.92 | 89.90 |
| (3) Sodium tripolyphosphate (STP) | 88.30 | 90.74 |

In the foregoing table a statistically significant difference is .68.

At a concentration of .03% (Column I) it is evident that the HHP mixture affords a level of cleaning performance substantially superior both to STP and to EHDP at equal concentrations. The magnitude of the improvement provided by the HHP mixture at .03% can be fully appreciated by noting that at this relatively low concentration of builder (Column I), the HHP mixture achieved a cleaning value which is substantially equal to that obtained with STP at .06% (Column II). From this demonstration, it is apparent that in some situations it is possible to achieve a level of builder performance using only about one-half the concentration of the HHP mixture than would be required with STP.

By virtue of the capacity of the compounds of this invention to inhibit the crystal growth and development of calcium hydroxylapatite, they are useful as anti-calculus agents in oral compositions as more fully described and claimed in a concurrently filed co-pending, commonly assigned patent application, Ser. No. 693,713, abandoned in favor of Ser. No. 731,312 which is now U.S. Pat. 3,488,419, of Homer W. McCune and Nathaniel B. Tucker. This concurrently filed patent application is incorporated herein by reference.

What is claimed is:

1. Aliphatic vicinal polyphosphonic compounds having a formula where

R is hydrogen; —$CH_2OH$; or where

Y is hydrogen, alkali metal, ammonium, mono-ethanol ammonium, diethanol ammonium, or triethanol ammonium; and n is an integer which is 5, 6, 7 or 8.

2. Aliphatic vicinal polyphosphonic acids having a formula wherein

R is hydrogen; —$CH_2OH$; or —$CH_2(PO_3H_2)$; and n is an integer which is 5, 6, 7 or 8.

3. Water soluble salts of aliphatic vicinal polyphosphonic acids having a formula wherein R is hydrogen; —$CH_2OH$; or —$CH_2(PO_3Y_2)$; and wherein Y is sodium, potassium, lithium, ammonium, monoethanol ammonium, diethanol ammonium or triethanol ammonium;

and n is an integer which is 5, 6, 7 or 8.

4. Compounds of claim 1 wherein n is 5.
5. Compounds of claim 1 wherein n is 6.
6. Compounds of claim 1 wherein n is 7.
7. Compounds of claim 1 wherein n is 8.

References Cited

UNITED STATES PATENTS

| 2,957,931 | 10/1960 | Hamilton et al. | 260—970 |
| 3,157,694 | 11/1964 | Harwood | 260—502.4PLP |
| 3,363,032 | 1/1968 | Fitch | 260—502.4 |

OTHER REFERENCES

Freedman et al., "J. Am. Chem. Soc.," vol. 77 (1955), pp. 6221 to 6223.

Kenyon et al., "J. Am. Chem. Soc.," vol. 88 (1966), pp. 3557 to 3561.

BERNARD HELFIN, Primary Examiner

J. E. EVANS, Assistant Examiner

U.S. Cl. X.R.

23—108, 300; 210—58; 252—132, 135, 138, 161, 173; 260—456, 502.4, 932, 970, 982, 999